Dec. 23, 1941.   M. D. L. VAN OVER   2,267,629
METHOD OF INSULATION AND MEANS FOR POWERING MOTOR VEHICLES
Filed July 13, 1938    5 Sheets-Sheet 1
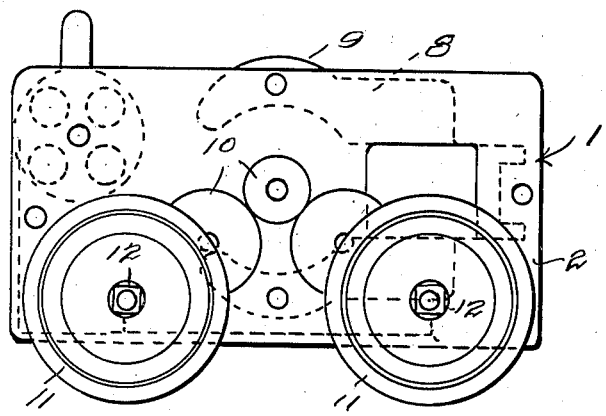
-FIG-1-
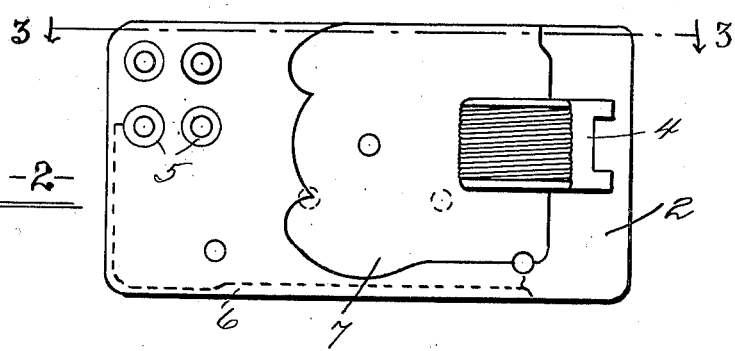
-FIG-2-
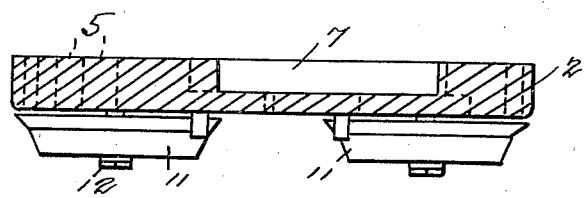
-FIG-3-
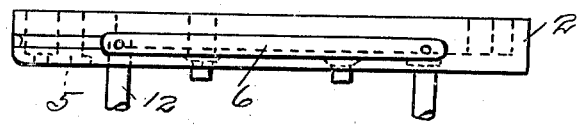
-FIG-4-
INVENTOR
M. D. L. VAN OVER,
BY
ATTORNEY Dec. 23, 1941.　　　M. D. L. VAN OVER　　　2,267,629
METHOD OF INSULATION AND MEANS FOR POWERING MOTOR VEHICLES
Filed July 13, 1938　　　5 Sheets-Sheet 2
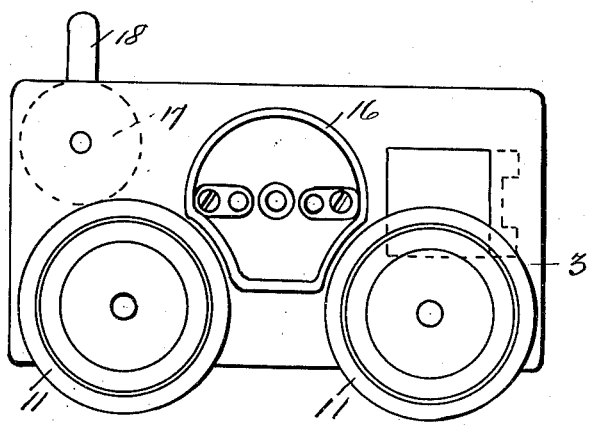
-FIG-5-
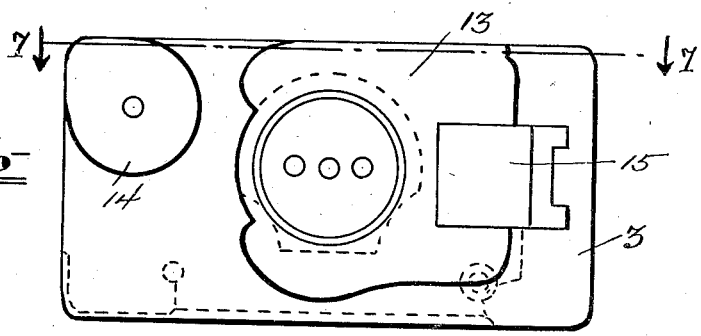
-FIG-6-
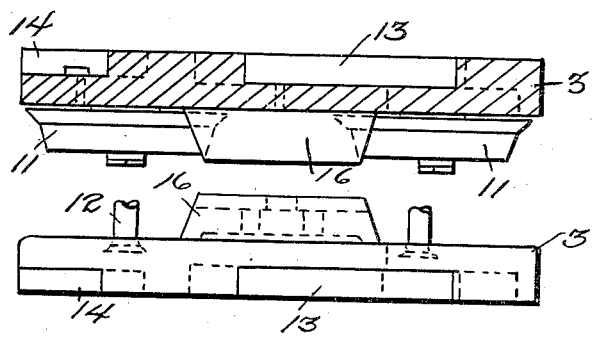
-FIG-7-
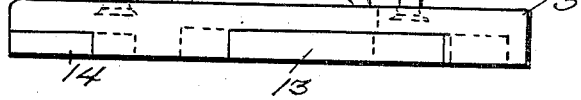
-FIG-8-
INVENTOR
M. D. L. Van Over,
BY
ATTORNEY

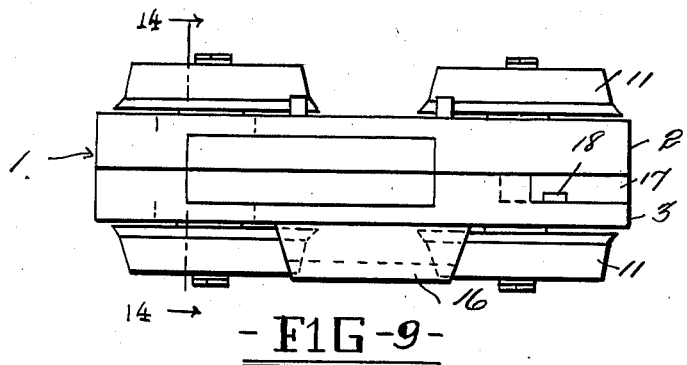
FIG-9-
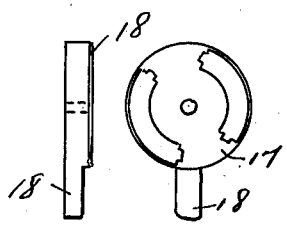
-FIG-11-  -FIG-12-
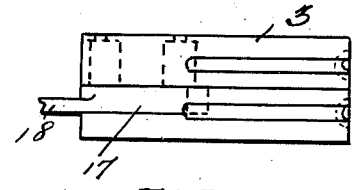
-FIG-10-
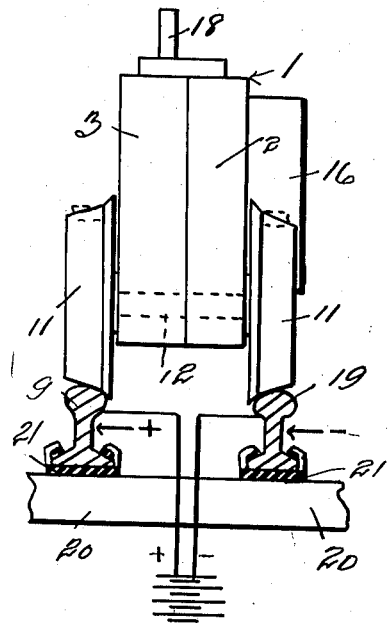
-FIG-13-
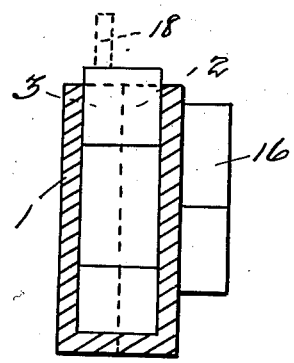
-FIG-14-
INVENTOR
M. D. L. Van Over,
BY
ATTORNEY Dec. 23, 1941. M. D. L. VAN OVER 2,267,629
METHOD OF INSULATION AND MEANS FOR POWERING MOTOR VEHICLES
Filed July 13, 1938 5 Sheets-Sheet 4
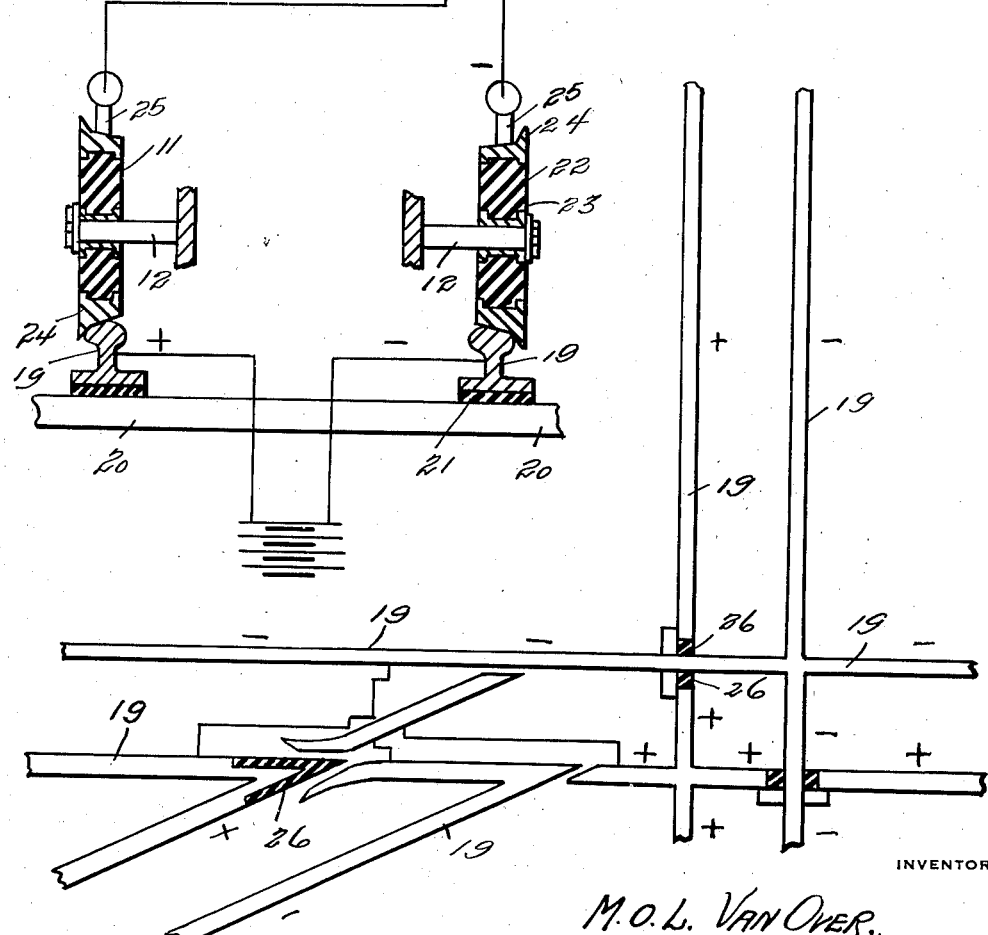
INVENTOR
M.O.L. VAN OVER,
BY
ATTORNEY Dec. 23, 1941.    M. D. L. VAN OVER    2,267,629
METHOD OF INSULATION AND MEANS FOR POWERING MOTOR VEHICLES
Filed July 13, 1938    5 Sheets-Sheet 5
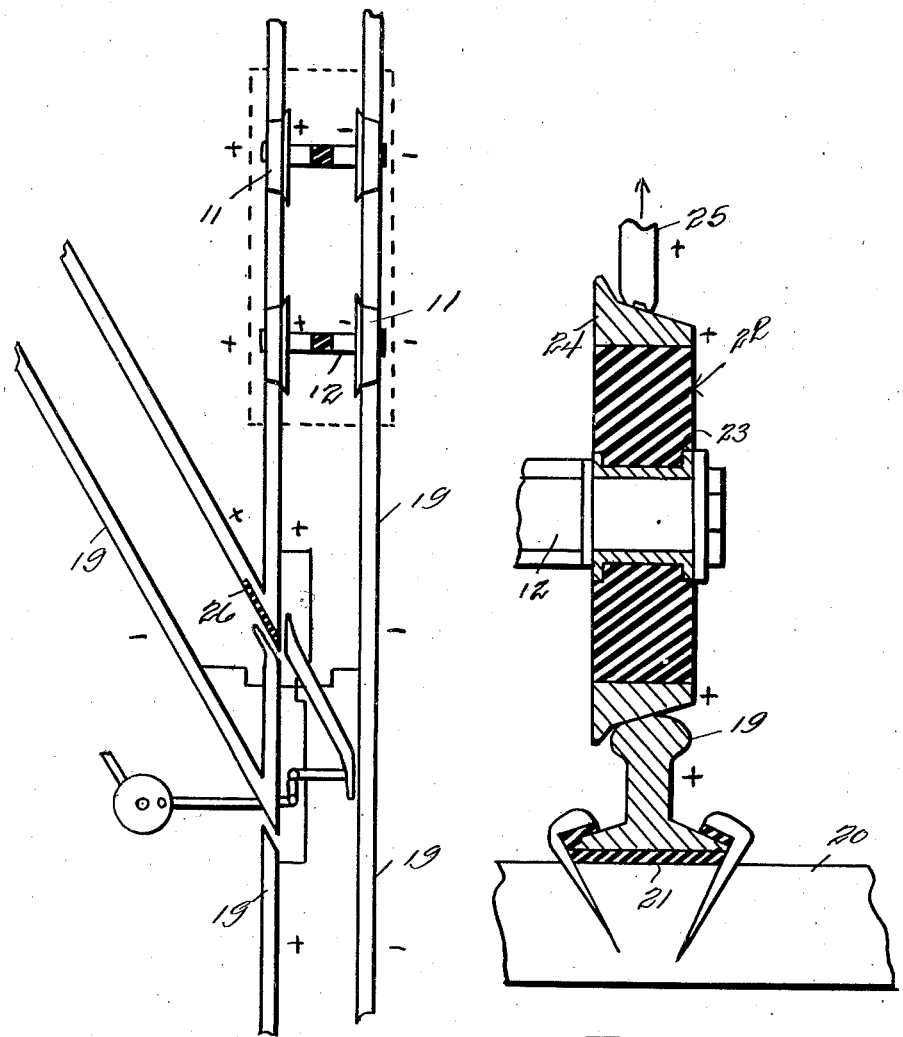
-FIG -17-        -FIG -18-
INVENTOR
M. O. L. VAN OVER,
BY
ATTORNEY Patented Dec. 23, 1941

2,267,629

UNITED STATES PATENT OFFICE 2,267,629

METHOD OF INSULATION AND MEANS FOR POWERING MOTOR VEHICLES

Marquis D. L. Van Over, Kearney, N. J.

Application July 13, 1938, Serial No. 219,066

1 Claim. (Cl. 105—49)

My present invention, in its broad aspect, has to do with improvements in insulating construction of electrically driven locomotives, miniature railways, toys, motor vehicles of the track type, engines and the like, whereby the power is furnished without the use of the so-called third rail. More particularly it is my purpose to utilize in the process of conduction the ordinary rails of a railway roadbed for the electric current, and to improve upon the construction of the engine and rolling stock by using insulating material for construction purposes so that in effect the current is picked up from the ordinary tracks and transmitted through the vehicle to the power plant; in effect the two rails, and the two longitudinally divided halves of the rolling stock on the rails constituting the positive and negative poles each of which is insulated from the other. My invention may be used either with standard or miniature railways, street cars, toys, transportation vehicles of all types—the same principle of construction and current conduction being used in all cases.

In practice my invention may be said to consist of insulating the component parts of an electrically operated train or trolley, and dividing the entire roadbed, i. e. the respective tracks, and the engine and cars or the car, into two separate sections, each insulated from each other so that one carries the positive current and the other the negative current for operation of the power plant, thereby eliminating entirely the use of third rails, trolleys and the like. Plastics are used in the construction of the engine, cars, wheels, tracks or any other parts of conventional design, except where current is desired to be carried. For instance the body of a car may be of molded synthetic resin with the exception of metal axles, bearings, gears and the like—any synthetic resin of the Bakelite type having a 3.5 dielectric strength may be employed for light structural design and the resulting structure will the insulated; for heavy duty equipment laminated Bakelite or similar material may be used. For instance the centers of all wheels or parts immediately surrounding the hubs or bearings and reaching to the rims or tires may be either of cast or molded dielectric plastic, and in forming the same the center sections of the wheels are formed on the hubs or bearings and the rims or tires pressed on the peripheries. For miniature railways, such as herein shown and illustrated, the engine is formed with two separate major body parts, each approximating one longitudinally divided half of the engine, and formed to receive and mount suitable metal parts such for instance as the motor consisting of the armature, brushes and the like, gears and field, and provided with means for mounting all transmission parts and the axles or spindles of the wheels. In assembling the engine the two dielectric (or Bakelite or synthetic resin) body parts are brought together with the operating parts in proper position so that when the body parts are attached together the engine is complete and operative and ready to run on two rails, one carrying positive current and the other negative current, there being provided suitable contact means such as brushes or the like for taking up the current from the wheel rims, axle sections or directly from the rails if desired. Suitable means for mounting the contact means is provided and the motor of the engine is preferably of the multiple speed-reversible type. A similar plan of construction may be used for standard, full size street cars, railways, engines, and the like, except that the details of construction of the dielectric body parts may be laminated Bakelite and modified for heavy duty.

This invention includes unique features or phases: (1) the use of a plastic such as synthetic resin, Bakelite, or other dielectric material for the principal or main parts of the structure of the engine or the like; (2) insulation of the rolling stock, the engine, or the like, and the roadbed, tracks or the like, so that the whole is divided into two separate halves insulated from each other; and (3) use of one half to carry positive current and the other half to carry negative current. The invention is subject to a wide application in use and wide variation in details of construction, since the principle is applicable wherever motive power is obtained from electric current, therefore, the right to make changes in size, shape, construction, form, arrangement, use and assembly of all parts is reserved provided same fall within the purview of the appended claims.

In the drawings, I have shown a preferred form of my invention, in which:

Figure 1 is a side view of a locomotive for a miniature electric railway;

Figure 2 is a longitudinal interior view through the same;

Figure 3 is a section taken on the line 3—3 of Figure 2;

Figure 4 is a bottom edge view of one section of the same;

Figure 5 is a side view of my engine or locomotive taken from the side opposite that shown in Figure 1;

Figure 6 is an interior view through the same taken longitudinally;

Figure 7 is a view taken on the line 7—7 of Figure 6;

Figure 8 is a top plan view of one section of the locomotive;

Figure 9 is a top plan view of the engine or locomotive;

Figure 10 is a view showing the reversing lever;

Figure 11 is an edge view of the reversing lever;

Figure 12 is a plan view of the reversing lever;

Figure 13 is an end view of the engine showing the manner of insulating the tracks;

Figure 14 is a transverse section with the wheels removed;

Figure 15 is a diagrammatic view of the wiring layout and contacts;

Figure 16 is a plan view of a conventional track crossing and switch;

Figure 17 is a plan view of a track frog or angular intersection, and

Figure 18 is a section through a wheel and track and shows the conductor, insulating and contact means.

In the drawings wherein like characters of reference are used to designate like or similar parts throughout the several views:

The numeral 1 designates the body part of an engine or locomotive of the type designed for a miniature or toy railway, said body part being formed entirely of plastic such as synthetic resin or Bakelite having a dielectric strength of about 3.5, and which may be molded or otherwise formed. The body part has two similar sections 2 and 3; section 2 being shown in Figure 2 and section 3 in Figure 6. The sections are designed to be placed together along a center line or face to face to retain and mount the operative parts therein. Referring to section 2 shown in Figures 2, 3 and 4; the interior view of Figure 2 shows the field 4, openings 5 for the reversing mechanism, and an electric conduit 6 shown in dotted lines in Figure 2 and in full lines in Figure 4; a depressed space 7 is left to house the motor 8, and the armature, brushes, magnet 9 and drive gears 10 which are shown in Figure 1; the wheels 11 being mounted on axles 12 carried by the sections and shown in Figures 1 and 3. Section 3 shown in Figures 7, 8 and 9 has a depressed part or space 13 similar to space 7 of section 2, another depression 14 to receive the reversing mechanism, and still another depression 15 to receive the coil or field 4. Figure 7 shows the guard or hood 16 for the drive gears.

Referring to Figure 9 which shows a top plan view of the engine, it will be noted that sections 2 and 3 are placed face to face and held together with depressed spaces 7 and 13 registering to retain the motor, and the reversing mechanism and wheels in place. The reversing mechanism is shown in Figures 10, 11 and 12; and comprises a contact plate 17 and a hand lever 18 operable from without the body part of the engine as shown in Figure 10.

Tracks 19 and ties 20 are provided; the tracks being insulated from each other and from the ties by suitable insulation 21 as shown in Figure 13 so that one track is insulated from the other track and both tracks are insulated from the ties and spikes 22.

Referring to Figures 15 and 16, it will be noted that the wheels 11 have an insulated body part 22' with hubs 23 and rims 24; the rims contact with the respective tracks 19 and an electric contact 25 engages the top of the rim, and is in circuit (one for each wheel) with the electric motor as shown in Figure 15. Thus when one track carries positive current, and the other negative current, the contacts pick up that current and transmit same through suitable wiring or other means to the motor to actuate the same and propel the engine.

In Figures 16 and 17 representative track layouts are shown. Figure 16 shows a cross over and frog, all portions of the track being insulated from each other so that short circuiting will be prevented. Such track insulation being shown at 26, and if desired the axles 12 between the wheels may be made sectional and insulated between the sections as shown in Figure 17.

From the foregoing it is believed that the operation and advantages of my invention will be apparent but it is pointed out that there are a number of advantageous features and advantages: (1) construction is simplified since but two insulating body sections are employed, (2) wiring and the transmission of current is simplified and wiring breaks, third rails, trolleys, and the like are eliminated, (3) short circuiting is largely provided against, (4) costs of manufacture are reduced, (5) simplification of operation and absence of fragile and breakable parts provided, (6) saving in current consumption and reduction in parts, friction, and complicated switches and connections attained, and, (7) the invention renders the operation of vehicles by means of electric power more practical, efficient and inexpensive.

It is again emphasized that changes may be made in the details of construction and operation herein shown and described in detail, and determination of the scope of my inventive concept should only be made in the light of the subjoined claim.

I claim:

An electrically powered motor vehicle comprising a body of molded synthetic resin, said body formed in two longitudinal sections each constituting substantially half of the vehicle, an electric motor for driving said vehicle, each of said sections having a recess arranged to combinedly and insulatably support said motor in the vehicle, drive wheels insulatably carried upon said sections and arranged to be driven by said motor, a plurality of spaced switch contacts carried by one of said sections, a recess in said other section, a manually operable reversing switch element carried in said recess and arranged to be engageable with said contacts, whereby to render the direction of movement of said vehicle reversible, passages in said body sections, and electrical conductors in said passages arranged to electrically connect the motor and track engaging drive wheels through said switch.

MARQUIS D. L. VAN OVER.